(12) United States Patent
Okazaki

(10) Patent No.: US 7,576,731 B2
(45) Date of Patent: Aug. 18, 2009

(54) INFORMATION PROCESSING APPARATUS AND A METHOD OF CONTROLLING THE SAME THAT DETECTS POSITION COORDINATES WITHOUT SUPERIMPOSED NOISE

(75) Inventor: Hidetoshi Okazaki, Minato-ku (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 766 days.

(21) Appl. No.: 11/168,350

(22) Filed: Jun. 29, 2005

(65) Prior Publication Data

US 2006/0055680 A1    Mar. 16, 2006

(30) Foreign Application Priority Data

Sep. 10, 2004    (JP)    ............................. 2004-263485

(51) Int. Cl.
*G06G 3/041*    (2006.01)
(52) U.S. Cl. ..................................... 345/173
(58) Field of Classification Search ........... 345/87–104, 345/173–178, 204
See application file for complete search history.

(56) References Cited

U.S. PATENT DOCUMENTS 6,229,528 B1 *    5/2001    Okajima et al. ............. 345/173
6,236,386 B1 *    5/2001    Watanabe .................... 345/98

FOREIGN PATENT DOCUMENTS

JP    10-040016 A    2/1998
JP    11-352462    * 12/1999

* cited by examiner

*Primary Examiner*—Sumati Lefkowitz
*Assistant Examiner*—Robert E Carter, III
(74) *Attorney, Agent, or Firm*—Volentine & Whitt, P.L.L.C.

(57) ABSTRACT

An information processing apparatus has a resistance film type touch panel generating position coordinate data at a predetermined sampling interval, a liquid crystal display panel driven by a liquid crystal drive voltage, a first control circuit having a first generating circuit generating a horizontal synchronizing signal, a second generating circuit generating an alternating current signal for reversing the polarity of the liquid crystal drive voltage based on the horizontal synchronizing signal, and a third generating circuit generating a noise warning signal based on the horizontal synchronizing signal, the noise warning signal telling the interval at which the polarity of the liquid crystal drive voltage reverses; and a second control circuit changing the predetermined sampling interval based on the noise warning signal and detecting a position coordinate input from the resistance film type touch panel at the changed predetermined sampling interval.

15 Claims, 9 Drawing Sheets

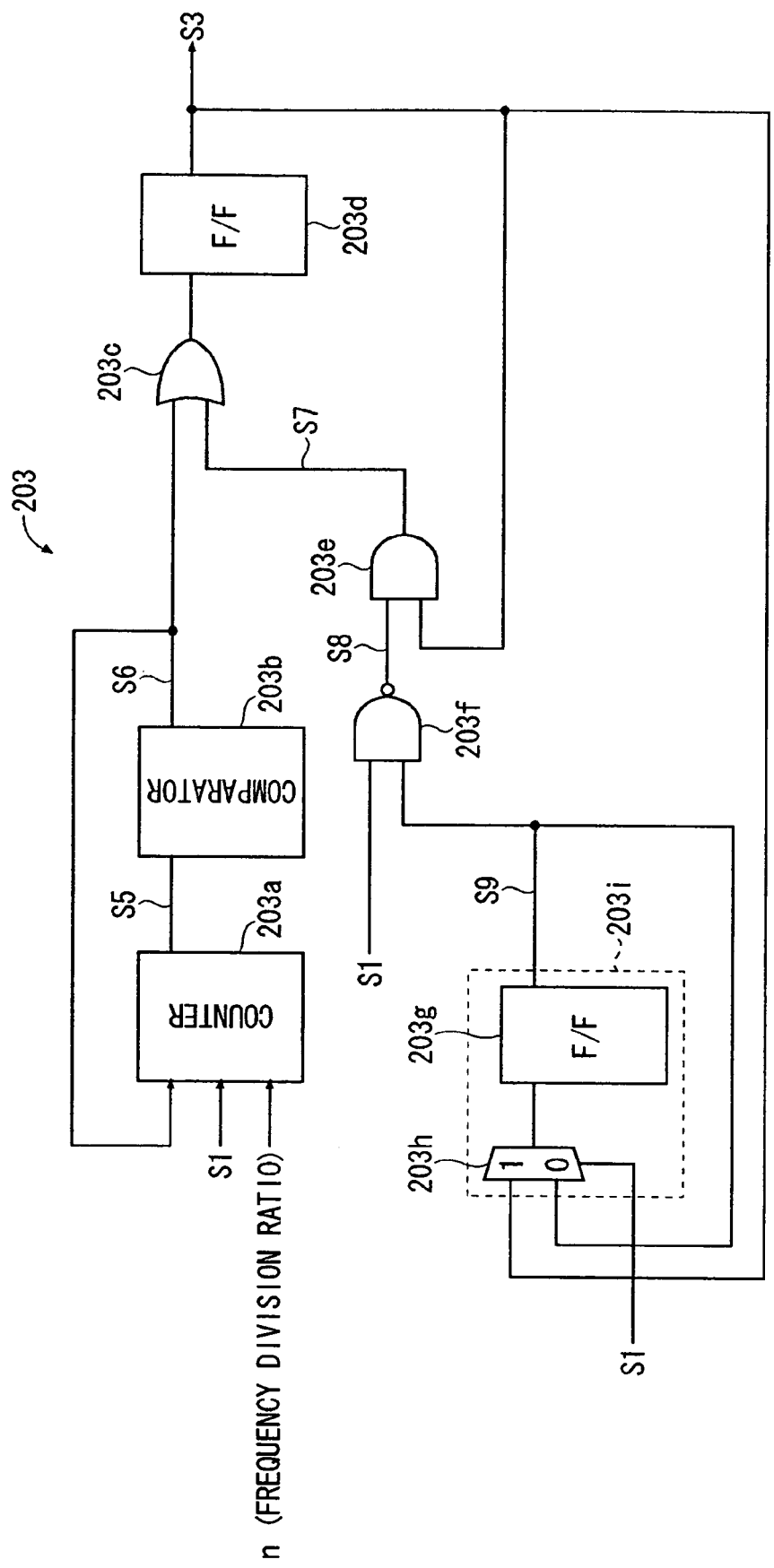

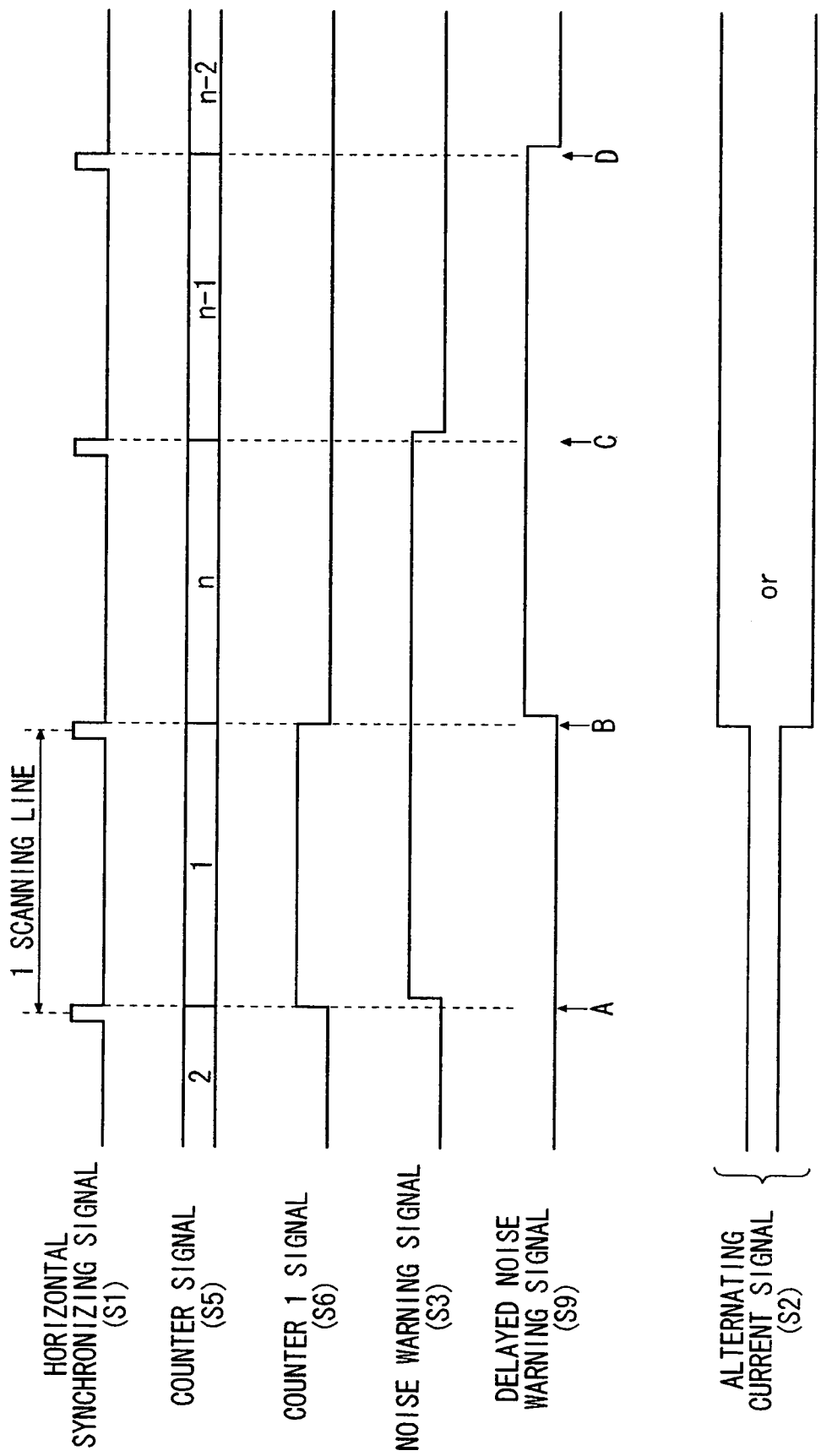

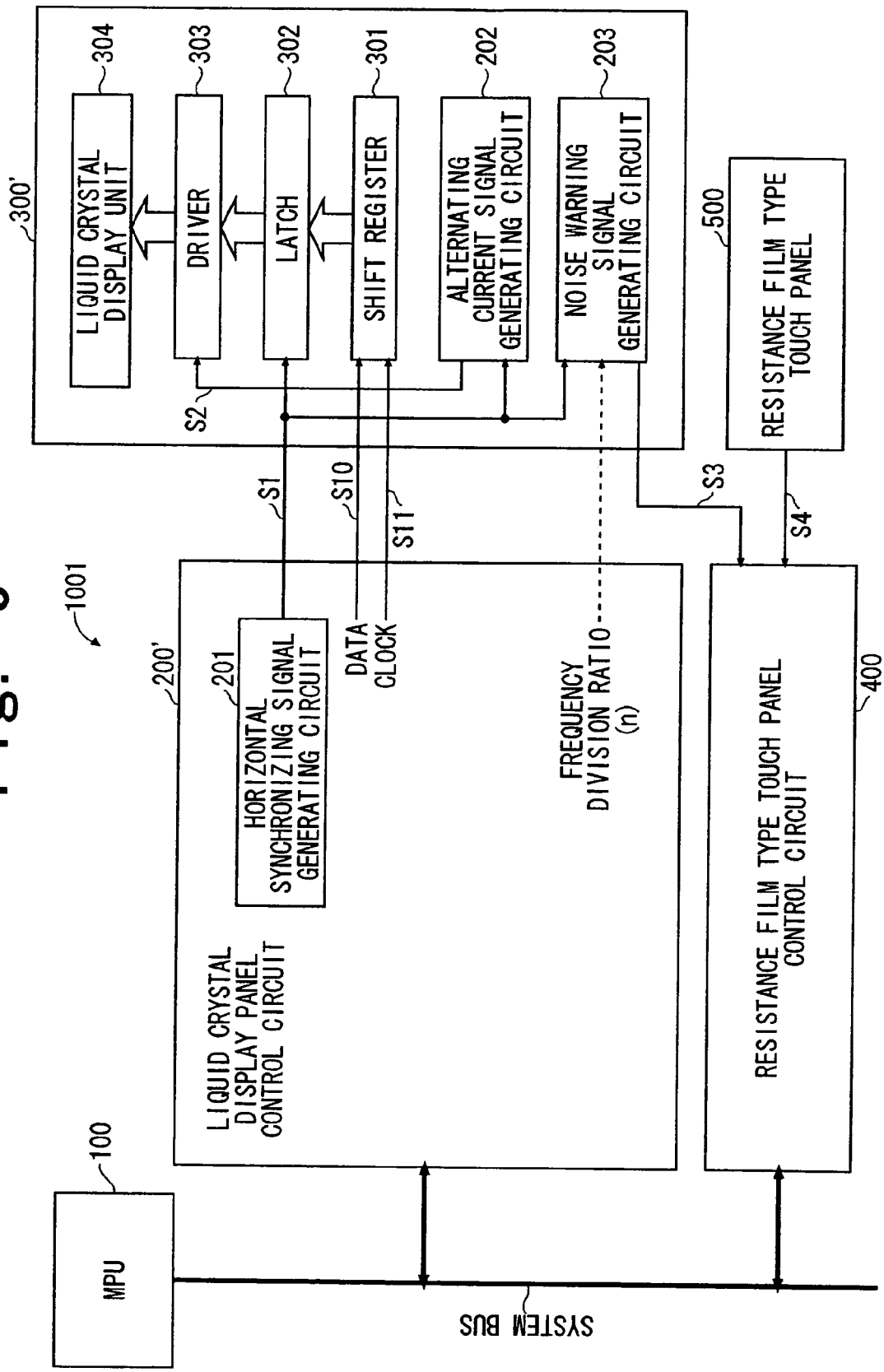

INFORMATION PROCESSING APPARATUS AND A METHOD OF CONTROLLING THE SAME THAT DETECTS POSITION COORDINATES WITHOUT SUPERIMPOSED NOISE

BACKGROUND OF THE INVENTION

1. Field of the Invention

The present invention generally relates to an information processing apparatus and a method of controlling the same. More specifically, the present invention relates to an information processing apparatus using a liquid crystal display panel as an output device and a resistance film type touch panel as an input device, and a method of controlling the same.

2. Background Information

In recent years, small size portable personal computers having a touch panel combined with a liquid crystal display panel, which may be represented by a PDA (personal digital assistant), are widely available for practical use.

A type of liquid crystal display panel can be categorized to a simple matrix system represented by an STN (super twisted nematic), an active matrix system represented by a TFT (thin film transistor), etc. according to the drive system. In either type, however, in order to prevent degradation of the characteristics of a liquid crystal that could happen when direct current (DC) voltage is impressed for a long time, reverse drive is conducted at a certain fixed cycles for switching the polarity of a voltage that drives the liquid crystal.

Moreover, a type of touch panel can be categorized as a resistance film type, an electrostatic capacity type, an optical type, an ultrasonic type, etc. according to the principle of operation. Among these types, especially the resistance film type can be applied in small size and be acquired at low cost, and therefore, it has been widely used as an input device for a portable personal computer.

FIG. 1 shows a conventional information processing apparatus 1002 where a resistance film type touch panel is combined with a liquid crystal display panel. The information processing apparatus 1002 is provided with an MPU (micro processing unit) 100, a liquid crystal display panel control circuit 200, a liquid crystal display panel 300, a resistance film type touch panel control circuit 400, and a resistance film type touch panel 500.

The MPU 100 is connected with the liquid crystal display panel control circuit 200 and the resistance film type touch panel control circuit 400 through a system bus, and manages to control the entire information processing apparatus 1002. In this structure, the liquid crystal display panel control circuit 200 controls the liquid crystal display panel 300 based on the commands from the MPU 100, and the resistance film type touch panel control circuit 400 controls the resistance film type touch panel 500 based on the commands from the MPU 100.

The liquid crystal display panel control circuit 200 is provided inside with a horizontal synchronizing signal generating circuit 201 and an alternating current (AC) signal generating circuit 202. A horizontal synchronizing signal S1 generated by the horizontal synchronizing signal generating circuit 201 is first inputted to the liquid crystal display panel 300. One pulse of the horizontal synchronizing signal S1 is equivalent to one scanning line of the liquid crystal display panel 300.

The horizontal synchronizing signal S1 is also inputted to the alternating current signal generating circuit 202. The alternating current signal generating circuit 202 generates an alternating current signal S2 for reversing the polarity of a liquid crystal drive voltage based on the horizontal synchronizing signal S1. In concrete terms, the alternating current signal generating circuit 202 has a divider inside, and the divider divides (i.e. multiplies by 1/n) the frequency of the horizontal synchronizing signal S1 into a desired frequency. Accordingly, the alternating current signal S2 is generated.

Since one pulse of the horizontal synchronizing signal S1 is equivalent to one scanning line of the liquid crystal display panel 300 as mentioned above, when the alternating current signal S2 is generated by dividing the horizontal synchronizing signal S1 by 'n', for example, n scanning lines will simultaneously be subjected to a reverse drive by this alternating current signal S2. The frequency division ratio 'n', for instance, is set up at an internal register of the alternating current signal generating circuit 202 by software. In FIG. 1, for the sake of convenience, only some of the signals exchanged between the liquid crystal display panel control circuit 200 and the liquid crystal display panel 300 are shown.

The resistance film type touch panel 500 includes, for example, an upper film and a lower film where a conductive substance such as an ITO (indium tin oxide) film is formed at each opposing surface. There is a certain or predetermined spacing between the upper film and the lower film, and by pressing the upper or lower film with a finger, or a pen, etc., the upper film and the lower film can make contact with each other and conduct current.

The upper film and the lower film are respectively provided with electrodes whose directions are opposite from each other. For instance, the upper film has the electrode along the X-axis direction and the lower film has the electrode along the Y-axis direction. Voltage is impressed independently to each electrode.

When the resistance film type touch panel 500 is pressed, the impressed voltage will be divided by resistance depending on the pressed position, and the resistance-divided voltage will be outputted to the resistance film type touch panel control circuit 400 as a coordinate detection voltage S4.

The coordinate detection voltage S4 is supposed to be outputted independently from the X-axis coordinate and the Y-axis coordinate, but in this particular case, for the sake of convenience, the coordinate detection voltages S4 of the X-axis coordinate and the Y-axis coordinate will not especially be distinguished.

Based on the commands from the MPU 100, the resistance film type touch panel control circuit 400 samples the coordinate detection voltage S4 for a certain period of time and collects position coordinate data, which point out the pressed positions in the resistance film type touch panel 500. In FIG. 1, for the sake of convenience, only some of the signals exchanged between the resistance film type touch panel control circuit 400 and the resistance film type touch panel 500 are shown.

For example, an input device using a touch panel is indicated by Japanese Patent Application Laid-Open No. 10-40016 (hereinafter reference 1), especially pp. 2-3, FIGS. 1 and 4. Japanese Patent Application Laid-Open No. 10-40016 is hereby incorporated by reference. The touch panel input device given in the reference 1 includes a resistance film type touch panel having a film for detecting the X-axis coordinate and a film for detecting the Y-axis coordinate. The touch panel input device of the reference 1 further includes a means to avoid incorrect detection of position coordinates due to possible bending of the film in the resistance film type touch panel, and possible noises from a liquid crystal display panel and a CRT (cathode ray tube), which are put by the side of the touch panel input device.

Generally, a touch panel is used as a direct input device with respect to a display, and is attached close to the front of a liquid crystal display panel and such. As described above, in the liquid crystal display panel, the liquid crystal drive voltage is reversed at a certain fixed cycle. However, when the liquid crystal drive voltage is reversed, radiation noise is generated from the liquid crystal display panel and superimposed on a coordinate detection voltage of the adjacent touch panel. This causes an incorrect detection of position coordinates.

With respect to the structure of the information processing apparatus 1002 shown in FIG. 1, there is a problem, as just mentioned, that the position coordinates in the resistance film type touch panel 500 is detected incorrectly due to the radiation noise generated at the time the polarity of the liquid crystal drive voltage is reversed.

FIG. 2 shows the influence of the radiation noise over the coordinate detection in the resistance film type touch panel 500. Generally, the touch panel 500 is used in a state being attached close to the front of the liquid crystal display panel 300. In the liquid crystal display panel 300, the polarity of the liquid crystal drive voltage is reversed at a certain fixed cycle according to the alternating current signal S2. When the drive voltage is reversed, i.e. when the level of the alternating current signal S2 changes (i.e. from High level to Low level or from Low level to High level), radiation noise S4a is generated from the liquid crystal display panel 300. As shown in FIG. 2, the radiation noise S4a is superimposed on the coordinate detection voltage S4 from the resistance film type touch panel 500, and induces incorrect detection of position coordinates.

FIG. 3 is a time chart of the signals in the information processing apparatus 1002. One pulse of the horizontal synchronizing signal S1 is equivalent to one scanning line of the liquid crystal display panel 300. The alternating current signal S2 is generated by dividing the horizontal synchronizing signal S1. For instance, the alternating current signal S2 shown in FIG. 3 is generated by dividing the horizontal synchronizing signal S1 by six. The coordinate detection voltage S4 is position coordinate data with respect to the resistance film type touch panel 500. Sampling of the coordinate detection voltage S4 is repeatedly conducted for a certain period of time and asynchronously with the horizontal synchronizing signal S1 and the alternating current signal S2.

As described with reference to FIG. 2, a radiation noise may be generated at level changing intervals of the alternating current signal S2 (shown by arrows). When the level changing interval of the alternating current signal S2 and the sampling interval of the coordinate detection voltage S4 coincides with each other, as can be noted by the sampling interval indicated by arrow A in FIG. 3 for example, the radiation noise S4a will be superimposed on the waveform of the coordinate detection voltage S4 and change the original signal waveform.

In order to remove noise, the touch panel input device disclosed in the reference 1 detects coordinate data more than once with respect to each of the X-axis coordinate and the Y-axis coordinate, and determines the presence of noise by comparing the detected multiple coordinate data.

This noise removal method is noted as very effective in removing noises that are generated irregularly. However, this method is not effective in removing noises that are generated at a certain fixed cycle, as the radiation noise accompanied by the reversal of the liquid crystal drive voltage. In other words, this method is not effective in removing noises whose occurrence can be predicted in advance, because the processing time becomes redundant.

In view of the above, it will be apparent to those skilled in the art from this disclosure that there exists a need for an improved information processing apparatus and an improved method of controlling an information processing apparatus. This invention addresses this need in the art as well as other needs, which will become apparent to those skilled in the art from this disclosure.

SUMMARY OF THE INVENTION

It is therefore an object of the present invention to resolve the above-described problems, and to provide an improved information processing apparatus that prevents the influences of noises that may occur at certain cycles, i.e. noises whose occurrences can be predicted in advance, for example, the radiation noise that occurs by the reversal of polarity of the liquid crystal drive voltage of the liquid crystal display panel. It is also an object of the present invention to provide an improved method of controlling an information processing apparatus that is suitable for controlling an information processing apparatus that has a liquid crystal display panel as an output device and a resistance film type touch panel as an input device.

In accordance with a first aspect of the present invention, an information processing apparatus has a resistance film type touch panel, a liquid crystal panel, a first control circuit, and a second control circuit. The resistance film type touch panel generates position coordinate data according to predetermined sampling interval or timing. The liquid crystal display panel is driven by a liquid crystal drive voltage. The first control circuit includes first to third generating circuits. The first generating circuit generates a horizontal synchronizing signal. The second generating circuit generates an alternating current signal to reverse the polarity of the liquid crystal drive voltage based on the horizontal synchronizing signal. The third generating circuit generates a noise warning signal based on the horizontal synchronizing signal. The noise warning signal indicates the interval or timing when the polarity of the liquid crystal drive voltage reverses. Further, the second control circuit changes the predetermined sampling interval or timing based on the noise warning signal and detects a position coordinate inputted from the resistance film type touch panel at the changed predetermined sampling interval or timing.

In accordance with a second aspect of the present invention, an information processing apparatus has a resistance film type touch panel, a liquid crystal panel, a first control circuit, and a second control circuit. The resistance film type touch panel generates position coordinate data according to predetermined sampling interval or timing. The first control circuit includes a first generating circuit generating a horizontal synchronizing signal. The liquid crystal display panel is driven by a liquid crystal drive voltage, and has second and third generating circuits. The second generating circuit generates an alternating current signal to reverse the polarity of the liquid crystal drive voltage based on the horizontal synchronizing signal, and the third generating circuit generates a noise warning signal based on the horizontal synchronizing signal. The noise warning signal indicates the interval or timing when the polarity of the liquid crystal drive voltage reverses. Further, the second control circuit changes the predetermined sampling interval or timing based on the noise warning signal, and detects a position coordinate inputted from the resistance film type touch panel at the changed predetermined sampling interval or timing.

In accordance with a third aspect of the present invention, a method of controlling an information processing apparatus that has a resistance film type touch panel generating position to coordinate data at a predetermined sampling interval or timing and a liquid crystal display panel driven by a liquid crystal drive voltage, includes the steps of: generating a horizontal synchronizing signal; generating an alternating current signal to reverse the polarity of a liquid crystal drive voltage based on the horizontal synchronizing signal; generating a noise warning signal based on the horizontal synchronizing signal, the noise warning signal indicating the interval or timing when the polarity of the liquid crystal drive voltage reverses; and while changing the predetermined sampling interval or timing based on the noise warning signal as needed, detecting a position coordinate inputted from the resistance film type touch panel at the changed predetermined sampling interval or timing.

These and other objects, features, aspects, and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 7 is a view of a circuit diagram showing an internal composition of the noise warning signal generating circuit of the information processing apparatus according to the first embodiment of the present invention;

FIG. 8 is a view of a time chart of the signals in the noise warning signal generating circuit according to the first embodiment of the present invention; and FIG. 9 is a view of a schematic block diagram showing a system configuration of an information processing apparatus according to a second preferred embodiment of the present invention.

DETAILED DESCRIPTION OF THE PREFERRED EMBODIMENTS

Figure 1:
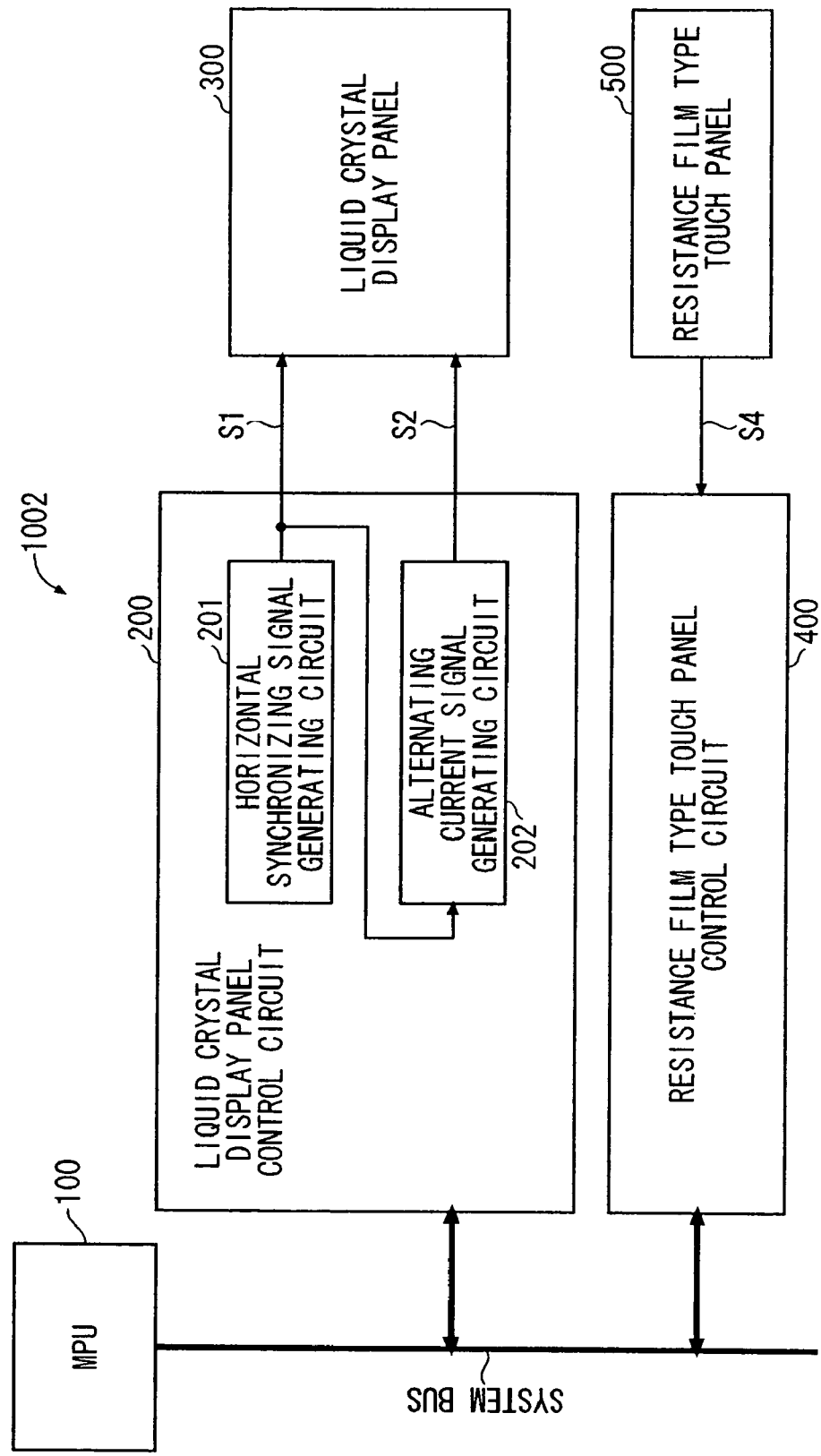
FIG. 1 is a view of a schematic block diagram showing a system configuration of a conventional information processing apparatus whose resistance film type touch panel is combined with a liquid crystal display panel.
Figure 2:
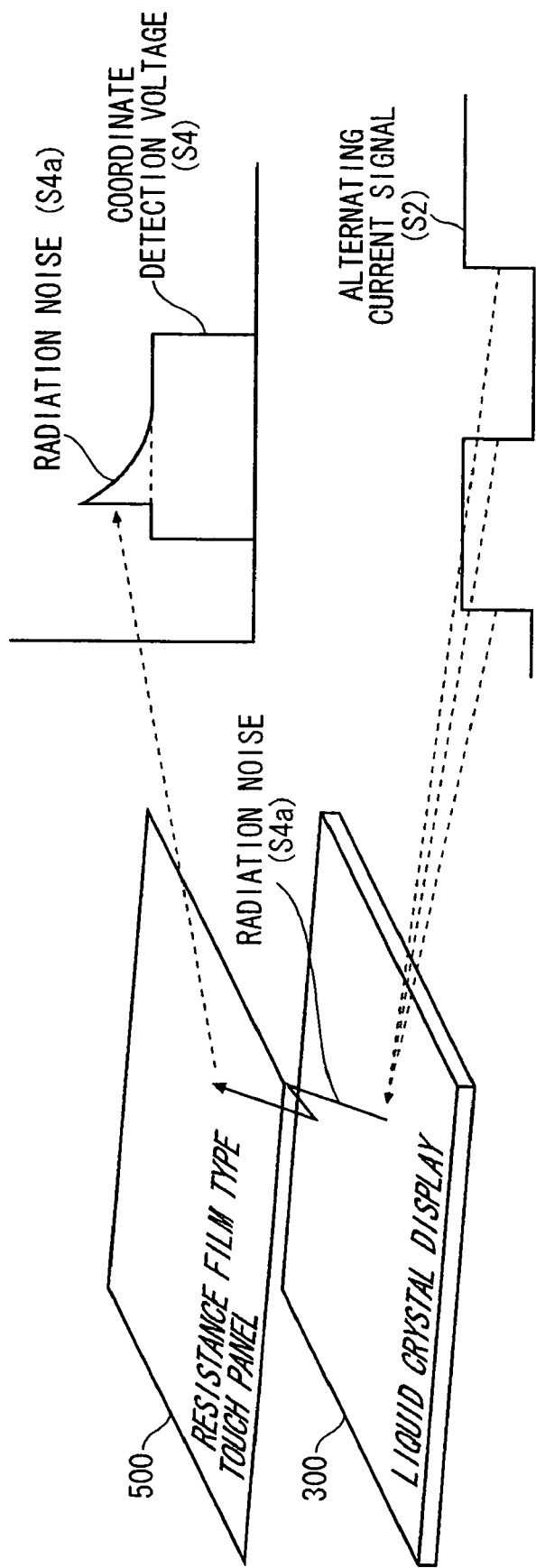
FIG. 2 is a schematic view illustrating the influence of the radiation noise over a coordinate detection in the resistance film type touch panel of FIG. 1.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring now to the drawings, preferred embodiments of the present invention will be described in detail.

(1) First Embodiment

Structure

Figure 4:
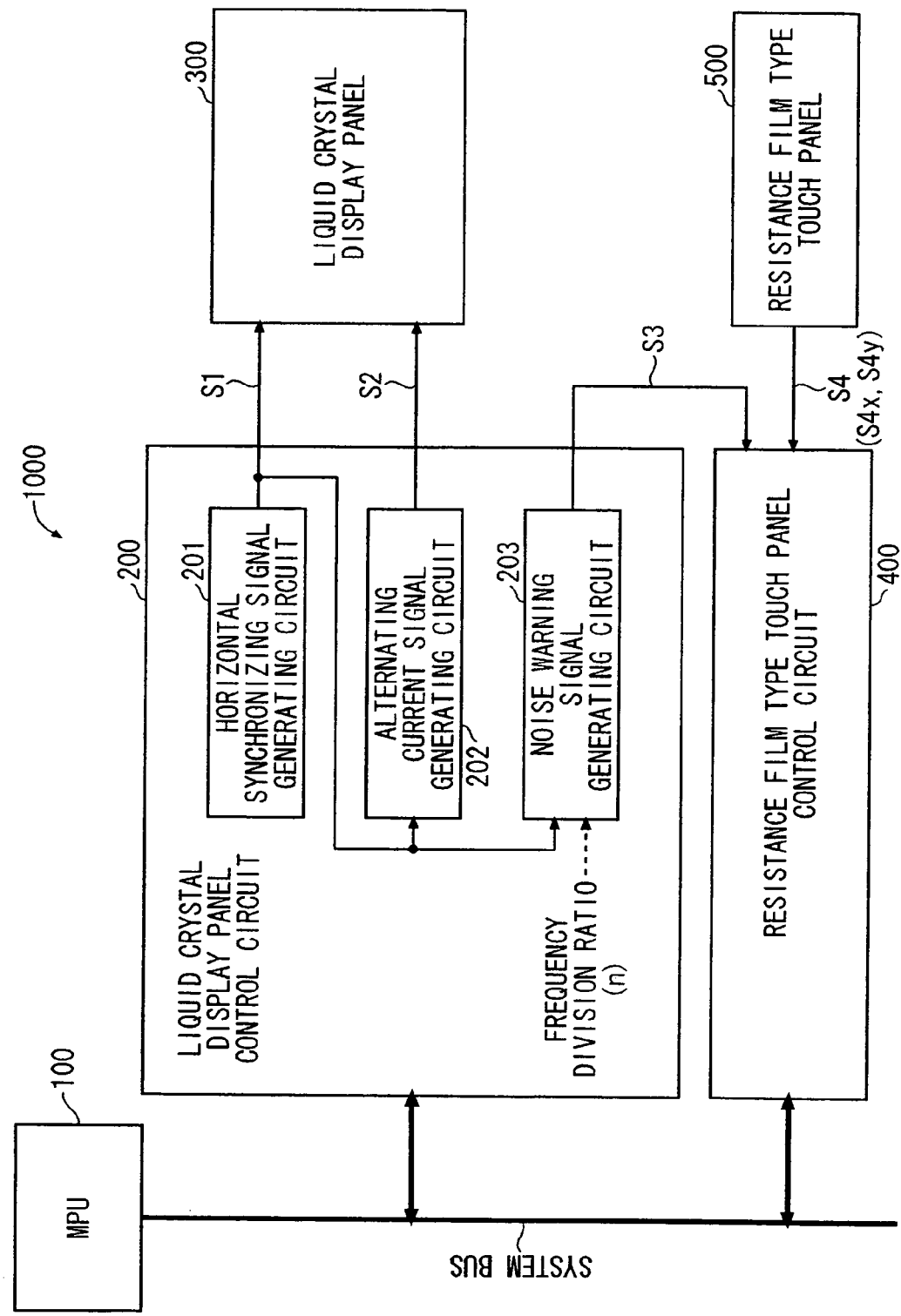
FIG. 4 is a view of a schematic block diagram showing a system configuration of an information processing apparatus according to a first preferred embodiment of the present invention.

FIG. 4 is a view of a schematic block diagram illustrating a system configuration of an information processing apparatus 1000 according to a first preferred embodiment of the present invention. As with the information processing apparatus 1002 shown in FIG. 1, the information processing apparatus 1000 is provided with an MPU 100, a liquid crystal display panel control circuit (first control circuit) 200, a liquid crystal display panel 300, a resistance film type touch panel control circuit (second control circuit) 400, and a resistance film type touch panel 500. In FIG. 4, with regards to identically or similarly structured elements as those of the conventional information processing apparatus 1002 shown in FIG. 1, the same reference numbers as used in FIG. 1 will be used, and redundant explanations of those structure elements will be omitted.

In the present embodiment, in addition to the horizontal synchronizing signal generating circuit (first generating circuit) 201 and the alternating current signal generating circuit (second generating circuit) 202, the liquid crystal display panel control circuit 200 is further provided inside with a noise warning signal generating circuit (third generating circuit) 203. A horizontal synchronizing signal S1 generated by the horizontal synchronizing signal generating circuit 201 is inputted to the liquid crystal display panel 300, the alternating current signal generating circuit 202, and the noise warning signal generating circuit 203. The noise warning signal generating circuit 203 generates a noise warning signal S3 based on the inputted horizontal synchronizing signal S1 and outputs it to the resistance film type touch panel control circuit 400. The noise warning signal S3 is a signal that indicates tells the interval at which the polarity of the liquid crystal drive voltage reverses. In other words, the noise warning signal S3 is the signal that indicates the interval at which the level of the alternating current (AC) signal S2 changes. The details of the noise warning signal generating circuit 203 will be explained later on.

Figure 5:
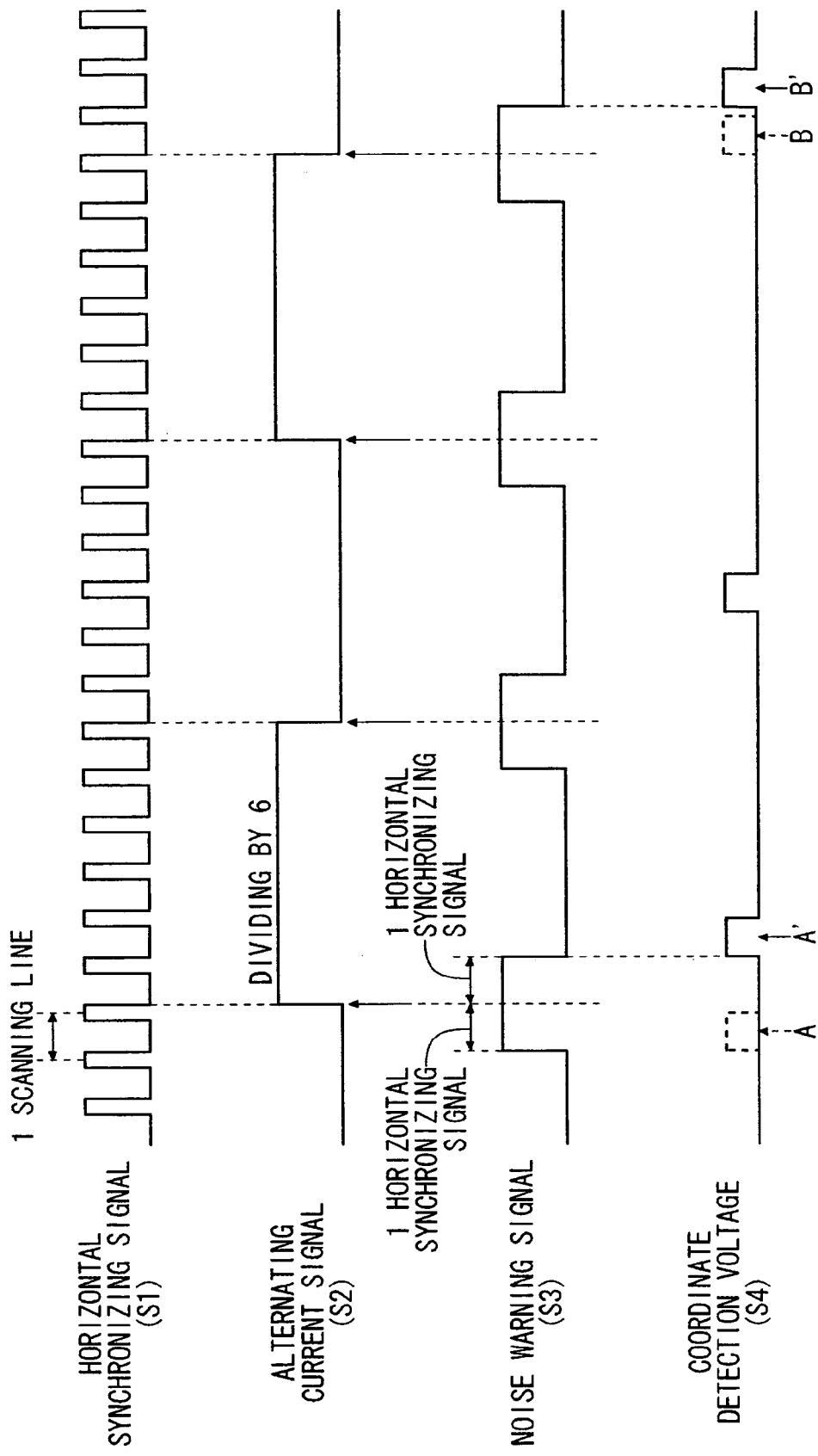
FIG. 5 is a view of a time chart of signals in the information processing apparatus according to the first embodiment of the present invention.

FIG. 5 is a time chart of the signals in the information processing apparatus 1000. One pulse of the horizontal synchronizing signal S1 is equivalent to one scanning line of the liquid crystal display panel 300.

The alternating current signal S2 is generated by dividing the horizontal synchronizing signal S1. In FIG. 5, for example, the alternating current signal S2 is generated by dividing the horizontal synchronizing signal S1 by six.

Based on the horizontal synchronizing signal S1, the noise warning signal S3 becomes one High level horizontal synchronizing signal before the level changing interval of the alternating current signal S2, and becomes one Low level horizontal synchronizing signal after the level changing interval of the alternating current signal S2.

Figure 3:
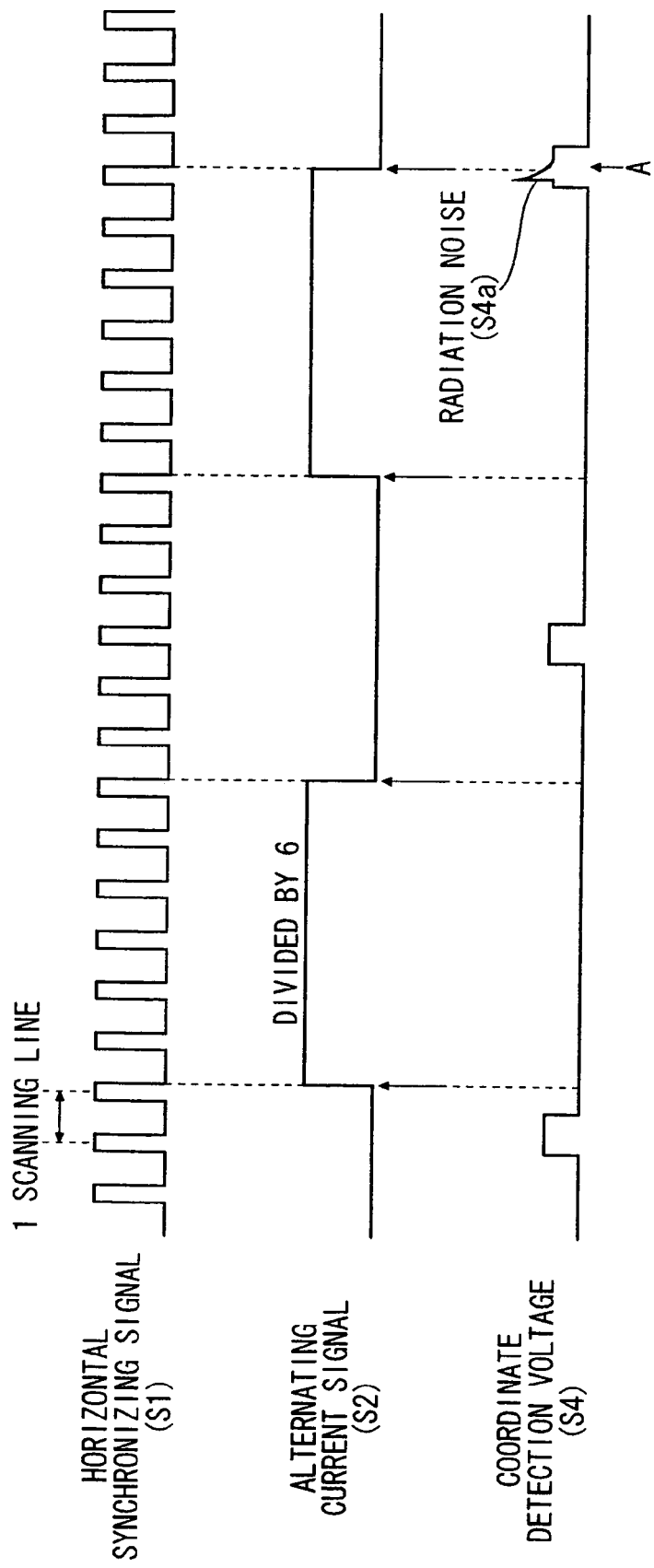
FIG. 3 is a view of a time chart of the signals in the information processing apparatus of FIG. 1.

The sampling of the coordinate detection voltage S4, which is the position coordinate data in the resistance film type touch panel 500, is basically the same as that in the case of the conventional information processing apparatus 1002 (FIG. 3). In other words, sampling of the coordinate detection voltage S4 is repeatedly conducted for a predetermined period of time and asynchronously with the horizontal synchronizing signal S1 and the alternating current signal S2. In other words, the resistance film type touch panel 300 generates position coordinate data at a predetermined sampling interval. However, in the first embodiment of the present invention, the information processing apparatus 1000 postpones the sampling of the coordinate detection voltage S4 until after the noise warning signal S3 becomes a Low level signal. For example, since the sampling intervals shown by arrows A and B in the time chart of the coordinate detection voltage S4 in FIG. 5 respectively correspond with the states of High levels of the noise warning signal S3, respectively, sampling of the coordinate detection voltage S4 will be postponed until after the noise warning signal S3 becomes a Low level signal. Then the sampling that is supposed to be done at the point of arrow A will be postponed and set to be done at the interval indicated by arrow A'. Similarly, the sampling which is supposed to be done at the point of arrow B will be postponed and set to be done at the interval indicated by arrow B'.

Figure 6:
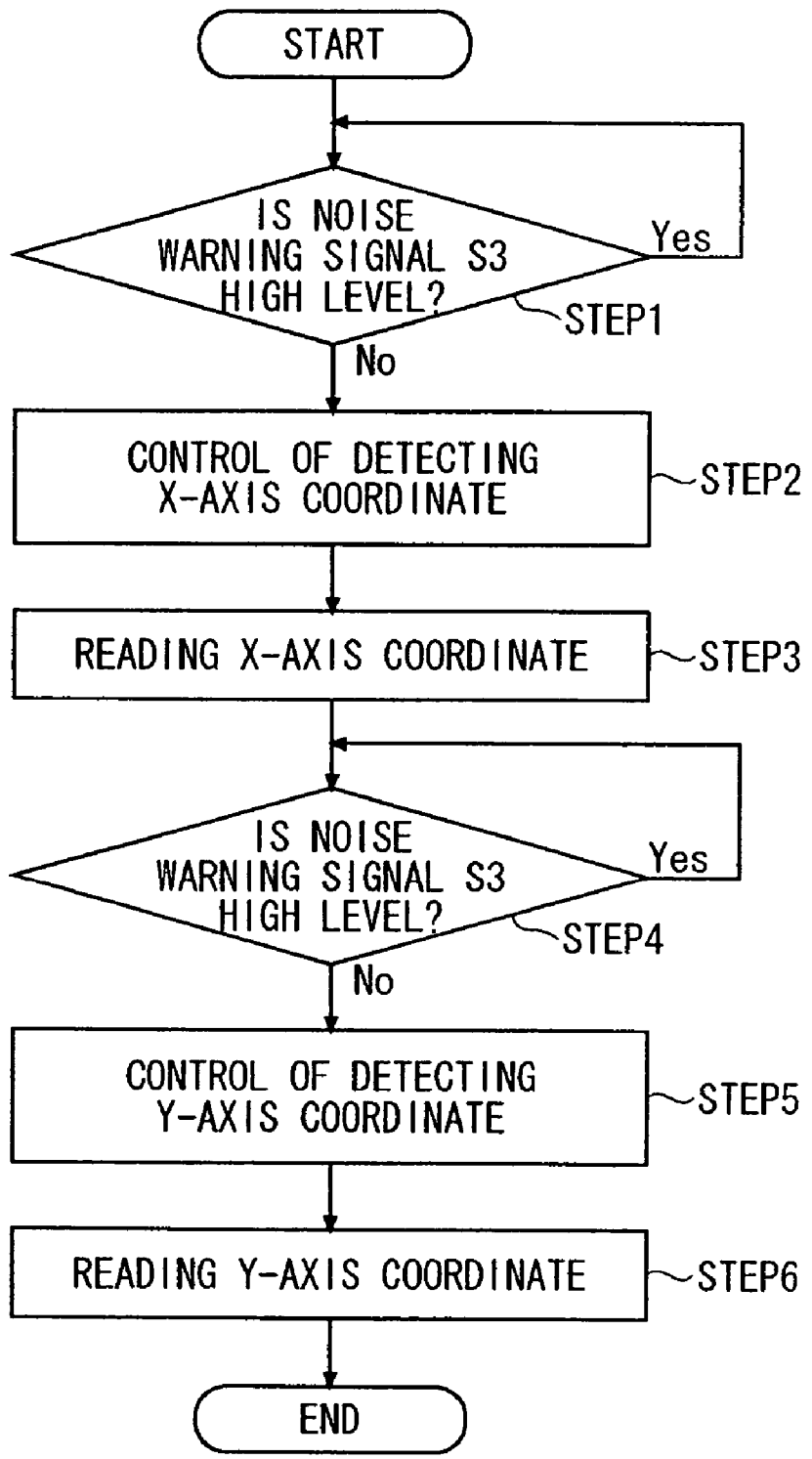
FIG. 6 is a view of a flow chart illustrating position coordinates detection in a resistance film type touch panel control circuit of the information processing apparatus according to the first embodiment of the present invention.

FIG. 6 is a flow chart explaining the position coordinates detection in the resistance film type touch panel control circuit 400. Detection of position coordinates is performed independently with the X-axis coordinate (STEP 1 to STEP 3) and the Y-axis coordinate (STEP 4 to STEP 6).

First, at STEP 1, the resistance film type touch panel control circuit 400 determines whether the noise warning signal S3 that has been received is a High level signal. If the noise warning signal S3 is a High level signal (Yes of the STEP 1), since it corresponds with the interval at which the polarity of the liquid crystal drive voltage S4 reverses, the resistance film type touch panel control circuit 400 will not perform the detection process of the X-axis coordinate until after the noise warning signal S3 becomes a Low level signal.

On the other hand, in STEP 1, if the noise warning signal S3 is Low level (No of STEP 1), the resistance film type touch panel control circuit 400 proceeds to STEP 2. At STEP 2, the resistance film type touch panel control circuit 400 will send the command to detect the X-axis coordinate to the resistance film type touch panel 500 in order to make it detect the X-axis coordinate detection voltage S4x and send this voltage (S4x) to the resistance film type touch panel control circuit 400. Then, at STEP 3, the resistance film type touch panel control circuit 400 samples the X coordinate detection voltage S4x received from the resistance film type touch panel 500 and detects the X-axis coordinate according to it.

Next, at STEP 4, the resistance film type touch panel control circuit 400 determines whether the noise warning signal S3 that has been received is a High level signal. If the noise warning signal S3 is a High level signal (Yes of STEP 4), since it corresponds with the interval at which the polarity of the liquid crystal drive voltage S4 reverses, the resistance film type touch panel control circuit 400 will not perform the detection process of the Y-axis coordinate until after the noise warning signal S3 becomes a Low level signal.

On the other hand, in STEP 4, if the noise warning signal S3 is a Low level signal (No of STEP 4), the resistance film type touch panel control circuit 400 proceeds to STEP 5. At STEP 5, the resistance film type touch panel control circuit 400 will send the command for detecting the Y-axis coordinate to the resistance film type touch panel 500 in order to make it detect the Y-axis coordinate detection voltage S4y and send this voltage (S4y) to the resistance film type touch panel control circuit 400. Then, at STEP 6, the resistance film type touch panel control circuit 400 samples the Y-axis coordinate detection voltage S4y received from the resistance film type touch panel 500 and detects the Y-axis coordinate according to it.

In this way, by checking the level of the noise warning signal S3 in advance of the detection of the position coordinates, the radiation noise S4a accompanied by the polarity reversal of the liquid crystal drive voltage S4 can be effectively prevented.

Next, details of the noise warning signal generating circuit 203 with respect to the first embodiment of the present invention will be described.

FIG. 7 is a view of a circuit diagram illustrating the internal composition of the noise warning signal generating circuit 203. The noise warning signal generating circuit 203 is provided with a counter 203a, a comparator 203b, an OR circuit 203c, at least one flip-flop (F/Fs) 203d, an AND circuit 203e, a NAND circuit 203f, and a delay circuit 203i. The delay circuit 203i provided with a flip-flop 203g and a switch 203h.

The counter 203a counts the horizontal synchronizing signal S1 inputted from the horizontal synchronizing signal generating circuit 201. Specifically, the counter 203a receives a count 1 signal (first signal) S6 outputted from the comparator 203b, which is to be described later. If both the horizontal synchronizing signal S1 and the count 1 signal S6 are High level signals, the counter 203a reads in the frequency division ratio 'n' through an internal bus and set it as a counter value. Then, whenever the count 1 signal S6 is Low level, the counter 203a decrements the count value one by one from 'n' (i.e. frequency division ratio) down to '1' according to the horizontal synchronizing signal S1. The count value is inputted to the comparator 203b as a count signal S5.

The comparator 203b receives the count signal S5 from the counter 203a, and when the count signal S5 is '1', it sets the count 1 signal S6 to High level. In other words, the count 1 signal S6 is set to High level in case when the horizontal synchronizing signal S1 is counted by the number of the dividing ratio 'n'. The count 1 signal S6 is fed back to the counter 203a while it is inputted to the OR circuit 203c.

The OR circuit 203c takes a logical sum of the count 1 signal S6 from the comparator 203b and a signal S7 from the AND circuit 203e, and outputs the result to the flip-flop 203d as a noise warning signal S3 through the flip-flop 203d. The AND circuit 203e takes a logical multiplication of the noise warning signal S3 being fed back from the flip-flop 203d and a signal S8 from the NAND circuit 203f, and outputs the result as a signal S7 to the OR circuit 203c. The NAND circuit 203f takes a non-conjunction of the horizontal synchronizing signal S1 and a delayed noise warning signal S9 outputted from the flip-flop 203g of the delay circuit 203i, and outputs the result as a signal S8 to the AND circuit 203e.

The switch 203h switches the noise warning signal S3 fed back from the flip-flop 203d and the delayed noise warning signal S9 fed back from the flip-flop 203g by the horizontal synchronizing signal S1, and outputs the noise warning signal S3 or the delayed noise warning signal S9 as a delayed noise warning signal S9 through the flip-flop 203g. For example, when the horizontal synchronizing signal S1 is High level (1), the noise warning signal S3 is outputted from the switch 203h as the delayed noise warning signal S9, and when the horizontal synchronizing signal S1 is Low level (0), the delayed noise warning signal S9 is outputted from the switch 203h. The delayed noise warning signal S9 is a signal corresponding to the noise warning signal S3 being delayed by one cycle of the horizontal synchronizing signal S1.

FIG. 8 is a view of a time chart of the signals in the noise warning signal generating circuit 203. In FIG. 8, the operation of the noise warning signal generating circuit 203 of FIG. 7 will be explained based on each of the intervals shown by arrows A to D.

In the case of FIG. 8, first, it is supposed that at the interval shown by arrow A the counter 203a receives the horizontal synchronizing signal S1 of a High level, and the count value is set to '1'. Referring now to FIGS. 7 and 8, at this time, '1' is outputted as a count signal S5 from the counter 203a. As the comparator 203b receives the count signal S5 and determines that the counter signal S5 corresponds to '1', it pulls the count 1 signal S6 up to High level. When the count 1 signal S6 is High level, the output of the OR circuit 203c will become High level, and therefore, the noise warning signal S3 will be pulled up to High level with a delay of predetermined period of time that is decided by the flip-flop circuit 203d. On the other hand, when the horizontal synchronizing signal S1 of High level is inputted to the switch 203h at the interval of arrow A, the level of the noise warning signal S3 at this interval, i.e. Low level in this case, will be selected. Accordingly, the delayed noise warning signal S9 will become a Low level signal.

Next, when the counter 203a receives the horizontal synchronizing signal S1 that is a High level one at the interval shown by arrow B, since the count 1 signal S6 having been fed back from the comparator 203b is at a High level, the counter 203a will read in the dividing ratio 'n', as described above. Then a count value will be set to 'n' and this value 'n' will be outputted as a count signal S5 from the counter 203a. As the comparator 203b receives the count signal S5 and determines that the count signal S5 is 'n', i.e. that the count signal does not correspond to '1', it pulls the count 1 signal S6 down to Low level. Moreover, at the interval of arrow B, since the delayed noise warning signal S9 is Low level, the output signal S8 from the NAND circuit 203f will become High level. Then, since both the output signal S8 of the NAND circuit 203f and the noise warning signal S3 are High level, the output signal S7 from the AND circuit 203e will become High level. Accordingly, the output of the OR circuit 203c will become High level, and the High level of the noise warning signal S3 will be maintained. On the other hand, when the horizontal synchronizing signal S1 of High level is inputted to the switch 203h at the interval of arrow B, the level of the noise warning signal S3 at this interval, i.e. High level in this case, will be selected. Accordingly, after one cycle of the horizontal synchronizing signal S1 from the rise interval of the noise warning signal S3, the delayed noise warning signal S9 will be pulled up to High level.

Next, when the counter 203a receives the horizontal synchronizing signal S1 of High level at the interval shown by arrow C, a count value will be set to 'n-1' and this value 'n-1' will be outputted as a count signal S5. As the comparator 203b receives the count signal S5 and determines that the count signal S5 is 'n-1', i.e. that the counter signal S5 does not correspond to '1', it maintains the count 1 signal S6 at Low level. Moreover, at the interval of arrow C, since both the delayed noise warning signal S9 and the horizontal synchronizing signal S1 are at High level, the output signal S8 from the NAND circuit 203f will become Low level. Then, since the output signal S8 of the NAND circuit 203f is Low level, the output signal S7 from the AND circuit 203e will become Low level. Accordingly, the output of the OR circuit 203c will become Low level, and the noise warning signal S3 will be pulled down to Low level with a delay of a predetermined period of time that is decided by the flip-flop circuit 203d. On the other hand, when the horizontal synchronizing signal S1 of High level is inputted to the switch 203h at the interval of arrow C, the level of the noise warning signal S3 at this interval, i.e. High level in this case, will be selected. Accordingly, the delayed noise warning signal S9 will be maintained at High level.

Next, when the counter 203a receives the horizontal synchronizing signal S1 that is at a High level at the interval shown by arrow D, a count value will be set to 'n-2' and this value 'n-2' will be outputted as a count signal S5. As the comparator 203b receives the count signal S5 and determines that the count signal S5 is 'n-2', i.e. that the count signal S5 does not correspond to '1', it maintains the count 1 signal S6 at Low level. Moreover, at the interval of arrow D, since both the delayed noise warning signal S9 and the horizontal synchronizing signal S1 are at High level, the output signal S8 from the NAND circuit 203f will become Low level. Then, since the output signal S8 of the NAND circuit 203f is Low level, the output signal S7 from the AND circuit 203e will become Low level. Accordingly, the output of the OR circuit 203c will become Low level, and the noise warning signal S3 will be maintained at Low level. On the other hand, when the horizontal synchronizing signal S1 of High level is inputted to the switch 203h at the interval of arrow D, the level of the noise warning signal S3 at this interval, i.e. Low level in this case, will be selected. Accordingly, after one cycle of the horizontal synchronizing signal S1 from the break interval of the noise warning signal S3, the delayed noise warning signal S9 will be pulled down to Low level.

Henceforth, the levels of the noise warning signal S3 and the delayed noise warning signal S9 will be maintained at Low level until the count value of the counter 203a is set to '1'. Thus, on the basis of the horizontal synchronizing signal S1, the noise warning signal S3 is generated so that it may become High level one signal before the level changing interval of the alternating current signal S2, and become Low level one signal after the level changing interval of the alternating current signal S2.

Operation Effect

With respect to the information processing apparatus 1000 according to the first embodiment of the present invention, the noise warning signal generating circuit 203 is newly added to the liquid crystal display panel control circuit 200 in order to generate the noise warning signal S3 that detects the interval at which the alternating current signal S2 changes. By this structure, influences of noises that may occur at certain cycles, i.e. noises of which occurrences can be predicted in advance, as the radiation noise that occurs by the reversal of polarity of the liquid crystal drive voltage of the liquid crystal display panel 300, can be effectively prevented. Therefore, with this structure, detections of position coordinates in the resistance film type touch panel 500 can be performed with improved accuracy.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

(2) Second Embodiment

Structure

FIG. 9 is a schematic view showing a system configuration of an information processing apparatus 1001 according to a second preferred embodiment of the present invention.

The information processing apparatus 1001 according to the second embodiment has a structure similar to that of the information processing apparatus 1000 according to the first embodiment shown in FIG. 4. However, in the information processing apparatus 1001, the main differences are that the alternating current signal generating circuit 202 and the noise warning signal generating circuit 203 are moved from the resistance film type touch panel control circuit 200 to the liquid crystal display panel 300' as shown in FIG. 9.

In addition, in FIG. 9, with regards to the structure element of the information processing apparatus 1001 that are the same as those of the information processing apparatus 1000 shown in FIG. 1 according to the first embodiment, the same reference numbers as used in FIG. 1 will be used, and redundant explanations of those structure elements will be omitted.

The information processing apparatus 1001 is provided with a MPU 100, a liquid crystal display panel control circuit 200', a liquid crystal display panel 300', a resistance film type touch panel control circuit 400, and a resistance film type touch panel 500.

The liquid crystal display panel control circuit 200' is provided inside with the horizontal synchronizing signal generating circuit 201. In this particular embodiment, the horizontal synchronizing signal S1 generated at the horizontal synchronizing generating circuit 201, display data S10, a data transfer clock S11 and the frequency division ratio 'n' are inputted from the liquid crystal display panel control circuit 200' to the liquid crystal display panel 300'.

The liquid crystal display panel 300' is provided inside with the alternating current signal generating circuit 202, the noise warning signal generating circuit 203, a shift register 301, a latch 302, a driver 303, and a liquid crystal display unit 304.

The alternating current signal generating circuit 202 generates the alternating current signal S2 based on the inputted horizontal synchronizing signal S1 and outputs it to the driver 303. The noise warning signal generating circuit 203 generates the noise warning signal S3 based on the inputted horizontal synchronizing signal S1 and outputs it to the resistance film type touch panel control circuit 400. Similar to or the same as the first embodiment, the noise warning signal S3 is a signal that indicates the interval at which the polarity of the liquid crystal drive voltage reverses. In other words, the noise warning signal S3 is the signal that indicates the interval at which the level of the alternating current (AC) signal S2 changes. In addition, the description of the noise warning signal generating circuit is the same as or similar to that of the first embodiment (e.g. FIGS. 7 and 8), and it is omitted in this explanation.

The shift register 301 changes the display data S10 transmitted as serial data into parallel data according to the data transfer clock S11. The latch 302 holds the parallel data of one scanning line as latch data based on the inputted horizontal synchronizing signal S1. The driver 303 reverses the polarity of the liquid crystal drive voltage based on the alternating current signal S2 received from the alternating current signal generating circuit 202 while drives the liquid crystal display panel 304 based on the latch data held in the latch 302.

The time chart of the signals in the information processing apparatus 1001 is the same as or similar to that of the first embodiment shown in FIG. 5. Furthermore, the flow chart of the position coordinates detection in the resistance film type touch panel control circuit 400 is the same as or similar to that of the first embodiment shown in FIG. 6.

Operation Effect

With respect to the information processing apparatus 1001 according to the second embodiment of the present invention, the alternating current signal generating circuit 202 and the noise warning signal generating circuit 203 are added to the liquid crystal display panel 300' in order to generate the noise warning signal S3 that detects the interval at which the alternating current signal S2 changes. By this structure, as with the first embodiment, influences of noise that may occur at certain cycles, i.e. noises whose occurrences can be predicted in advance, such as radiation noise that occurs by the reversal of polarity of the liquid crystal drive voltage of the liquid crystal display panel 300', can be effectively prevented. Therefore, with this structure, detections of position coordinates in the resistance film type touch panel 500 can be performed with improved accuracy.

This application claims priority to Japanese Patent Application No. 2004-263485. The entire disclosure of Japanese Patent Application No. 2004-263485 is hereby incorporated herein by references.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. An information processing apparatus comprising:
a resistance film touch panel generating position coordinate data at a sampling interval;
a liquid crystal display panel driven by a liquid crystal drive voltage;
a first control circuit having
a first generating circuit generating a horizontal synchronizing signal;
a second generating circuit generating an alternating current signal that reverses polarity of said liquid crystal drive voltage based on said horizontal synchronizing signal, and
a third generating circuit generating a noise warning signal based on said horizontal synchronizing signal, said noise warning signal indicating a time when the polarity of said liquid crystal drive voltage reverses; and
a second control circuit changing said sampling interval based on said noise warning signal and detecting a position coordinate input from said resistance film touch panel at said changed sampling interval,
wherein said second control circuit delays detecting the position coordinate input from said resistance film touch panel until said noise warning signal is deactivated from an active state that coincides with a timing for detecting the position coordinate.

2. The information processing apparatus according to claim 1, wherein said second generating circuit divides said horizontal synchronizing signal by a frequency division ratio, and outputs said divided horizontal synchronizing signal as an alternating current signal.

3. The information processing apparatus according to claim 2, wherein said third generating circuit comprises:
   a counter that decrements a counter value by one from said frequency division ratio down to a set value each time said horizontal synchronizing signal is received,
   a comparator that compares said counter value with said set value, and generates a first signal when said counter value corresponds to said set value, and
   a delay circuit that delays said noise warning signal by one horizontal synchronizing signal, and generates a delayed noise warning signal,
   wherein said noise warning signal is generated based on said first signal and said delayed noise warning signal.

4. The information processing apparatus according to claim 3, wherein said noise warning signal becomes a High level horizontal synchronizing signal before an interval in which a level of said noise warning signal changes, and becomes a Low level horizontal synchronizing signal after said interval in which the level of said noise warning signal changes.

5. The information processing apparatus according to claim 4, wherein said second control circuit delays the detection of said position coordinate until said noise warning signal becomes a Low level signal.

6. An information processing apparatus comprising:
   a resistance film touch panel generating position coordinate data at a sampling interval;
   a first control circuit having a first generating circuit generating a horizontal synchronizing signal;
   a liquid crystal display panel driven by a liquid crystal drive voltage, and having
      a generating circuit generating an alternating current signal that reverses polarity of said liquid crystal drive voltage based on said horizontal synchronizing signal, and
      another generating circuit generating a noise warning signal based on said horizontal synchronizing signal, said noise warning signal indicating a time when the polarity of said liquid crystal drive voltage reverses; and
   a second control circuit changing said sampling interval based on said noise warning signal and detecting a position coordinate input from said resistance film touch panel at said changed sampling interval,
   wherein said second control circuit delays detecting the position coordinate input from said resistance film touch panel until said noise warning signal is deactivated from an active state that coincides with a timing for detecting the position coordinate.

7. The information processing apparatus according to claim 6, wherein said generating circuit divides said horizontal synchronizing signal by a frequency division ratio, and outputs said divided horizontal synchronizing signal as said alternating current signal.

8. The information processing apparatus according to claim 7, wherein said another generating circuit comprises:
   a counter that decrements a counter value by one from said frequency division ratio down to a set value each time said horizontal synchronizing signal is received,
   a comparator that compares said counter value with said set value, and generates a first signal when said counter value corresponds to said set value, and
   a delay circuit that delays said noise warning signal by one horizontal synchronizing signal, and generates a delayed noise warning signal,
   wherein said noise warning signal is generated based on said first signal and said delayed noise warning signal.

9. The information processing apparatus according to claim 8, wherein said noise warning signal becomes a High level horizontal synchronizing signal before an interval when a level of said noise warning signal changes, and becomes a Low level horizontal synchronizing signal after said interval when the level of said noise warning signal changes.

10. The information processing apparatus according to claim 9, wherein said second control circuit delays detection of said position coordinate until said noise warning signal becomes a Low level signal.

11. A method of controlling an information processing apparatus comprising:
   preparing a resistance film touch panel to generate position coordinate data at a sampling interval;
   preparing a liquid crystal display panel driven by a liquid crystal drive voltage;
   generating a horizontal synchronizing signal;
   generating an alternating current signal to reverse polarity of said liquid crystal drive voltage based on said horizontal synchronizing signal;
   generating a noise warning signal based on said horizontal synchronizing signal, said noise warning signal indicating a time when polarity of said liquid crystal drive voltage reverses; and
   detecting said position coordinate generated by said resistance film touch panel while changing said sampling interval based on said noise warning signal,
   wherein said detecting of the generated position coordinate is delayed until said noise warning signal is deactivated from an active state that coincides with a timing for detecting the position coordinate.

12. The method of controlling an information processing apparatus according to claim 11, wherein said alternating current signal is generated by dividing said horizontal synchronizing signal by a frequency division ratio.

13. The method of controlling an information processing apparatus according to claim 12, wherein said generating a noise warning signal comprises:
   decrementing a counter value stored in a counter by one from said frequency division ratio down to a set value each time said horizontal synchronizing signal is received,
   comparing said counter value and said set value,
   generating a first signal when said counter value corresponds to said set value, and
   delaying said noise warning signal by one horizontal synchronizing signal,
   wherein said noise warning signal is generated based on said first signal and said delayed noise warning signal.

14. The method of controlling an information processing apparatus according to claim 13, wherein said noise warning signal becomes a High level horizontal synchronizing signal before an interval where a level of said noise warning signal changes, and becomes a Low level horizontal synchronizing signal after said interval where the level of said noise warning signal changes.

15. The method of controlling an information processing apparatus according to claim 14, wherein detection of the position coordinate is delayed until said noise warning signal becomes a Low level signal.

* * * * *